N. Harper,
Gage Lathe.
No. 1,994. Reissued June 13, 1865.
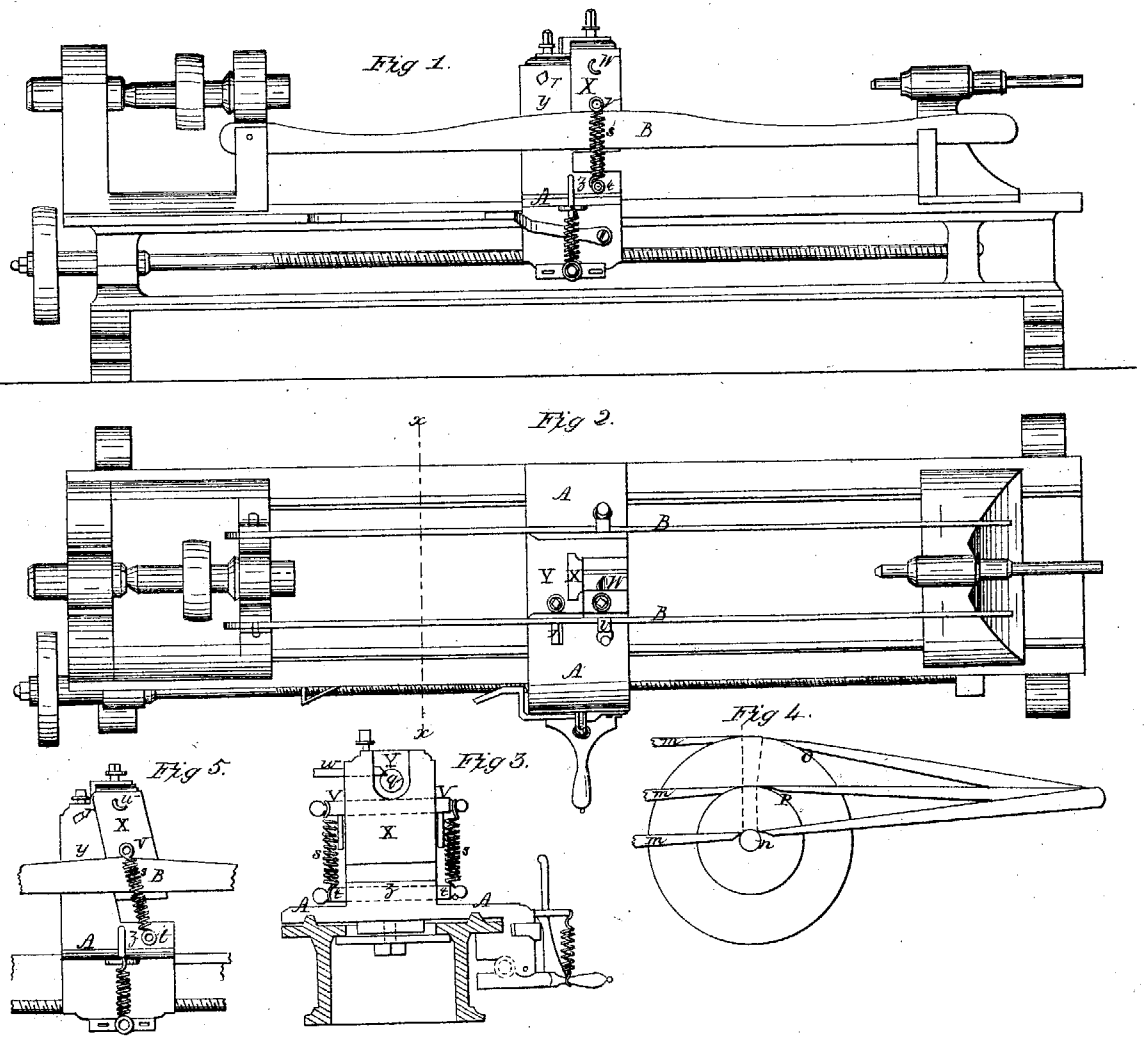
Witnesses.
T. C. Smith.
James J. Rooks.
Inventor
Nathan Harper
AM. PHOTO-LIT'HO. CO. N.Y. (OSBORNE'S PROCESS)

UNITED STATES PATENT OFFICE.

NATHAN HARPER, OF NEWARK, NEW JERSEY.

IMPROVEMENT IN TURNING-LATHES.

Specification forming part of Letters Patent No. 46,352, dated February 14, 1865; Reissue No. 1,994, dated June 13, 1865.

*To all whom it may concern:*

Be it known that I, NATHAN HARPER, of the city of Newark, in the county of Essex and State of New Jersey, have made certain Improvements in Shaping-Lathes; and I do hereby declare the following to be an exact and full description of the same, reference being herein had to the drawings that accompany this specification and make part of the same.

The nature of my invention or improvement consists in a peculiar construction and a new arrangement by which is attained a degree of perfection in workmanship never before obtained from a lathe of this class.

Figure 1 is a side view of a lathe embodying my invention. Fig. 2 is a plan of the same. Fig. 3 is a transverse section in the line *x x*. Fig. 4 is a diagram, and Fig. 5 is a different construction of the part X.

The same letters refer to the same parts in each figure.

The tool-post Z on the sliding carriage A is a compound rest constructed of parts Y and X, the parts being held together by a tongue and groove, or in any other manner that will secure the part X from any vibratory motion, while it leaves the same free to move in a straight line at an angle with the axis of the material being turned.

The part Y is fastened securely to the sliding carriage A, the carriage having but one motion, which is in a line parallel with the axis of the material being turned.

The part X has two movements—one with the sliding carriage A and parallel with the axis of the material being turned, the other in a straight line at right angles therewith, or upon any other straight line that forms an angle with the axis of the material being turned. In practice the part X may be duplicated to any extent desired.

The pins V V project one on each side of the part X, and rest on the shaping-patterns B, and are held down thereon by the springs S S, the lower end of the springs being fast to the pins *t t*. The use of these springs is simply to control the part X, and force it to conform in its movements to the shape of the patterns B. The same result may be obtained by a weight attached to the part X, or by any other device.

The cutting-tool *r* in the part Y reduces the material being turned to an exact fit in the hole *q*. (Shown in the upper part of Y at Fig. 3.) This hole holds the material steady, close to the cutting-tool *w*, while the latter, being securely fixed in the part X and sharing its movements, finishes the operation by reducing the material to a shape corresponding with the patterns B. When the material to be turned is strong enough to bear the action of the cutting-tool *w* without needing the support of the hole *q*, the part X can be so constructed as to be used without the part Y.

The part X may be of any shape, and may either extend entirely across the material to be turned, as at Fig. 2, or terminate on one side of the same. It may likewise be constructed so as to incline in its movement either to the right or to the left of a perpendicular line, as illustrated at Fig. 5.

Fig. 3 shows the shape and position of the cutting-tool *w*. The shaving is taken mostly endwise from the material being turned, the forward part of the cutting-tool extending to a line vertical with the axis of the same, thereby causing the last part of the shaving to be extremely fine. By means of this shape and position of the tool, combined with its movement in a straight line, the hardest, most knotty and cross-grained wood can be turned equally as smooth as the clearest and straightest, and to a less diameter than such material could ever before be turned by a shaping-lathe.

Fig. 4 shows the effect which takes place with a cutting-tool moving on a curved line, why it fails to produce the results obtained from one moving on a straight line, and the superiority of the latter. It will be seen that where the material being turned is of the diameter shown at P the tool can rest upon the wood back of the cutting-edge, and thereby preserve the even thickness of the shaving; but where the diameter increases to the size shown at O the heel of the tool lifts the edge above a cutting position, and where the diameter decreases to the size at *n*, then of necessity the tool digs or scrapes, instead of cutting.

I am aware of the existence of lathes having cutter-rests which move in straight vertical lines, and operate by their own gravity in combination with levers and shaping-patterns, and likewise of rests moving in horizontal lines, operated by levers and shaping-patterns. I am also aware of cutter-rests which move in curved lines and are operated by springs and shaping-patterns. All of these I therefore disclaim; but What I do claim, and desire to secure, is the following:

1. A rest constructed so as to move freely in a straight line at right angles with the axis of the material being turned, in combination with springs or weights and shaping-patterns, substantially as described.

2. A rest constructed so as to move freely in a straight line at either an acute or obtuse angle with the axis of the material being turned, substantially as described.

3. A compound rest, when composed of the functions above described, in combination with the rest having only a horizontal motion, substantially as described.

NATHAN HARPER.

Witnesses:
T. C. SMITH,
JAMES J. BROOKS.